(No Model.)

H. TIMM.
VOLTAIC BATTERY.

No. 522,127.  Patented June 26, 1894.

WITNESSES:
E. Wolff
Chas. C. Swengard

INVENTOR:
Henry Timm
BY
Hauff & Hauff
ATTORNEYS.

THE NATIONAL LITHOGRAPHING COMPANY,
WASHINGTON, D. C.

UNITED STATES PATENT OFFICE.

HENRY TIMM, OF NEW YORK, N. Y.

VOLTAIC BATTERY.

SPECIFICATION forming part of Letters Patent No. 522,127, dated June 26, 1894.

Application filed April 19, 1894. Serial No. 508,144. (No model.)

*To all whom it may concern:*

Be it known that I, HENRY TIMM, a citizen of the United States, residing at New York, in the county and State of New York, have invented new and useful Improvements in Voltaic Batteries, of which the following is a specification.

This invention consists in a voltaic couple which is formed of a dry layer of a soluble electrolyte inclosed between two layers of an absorbent material and two metallic plates of different polarity one of which is in close contact with the opposite faces of the absorbent layers inclosing the soluble electrolyte and protected from contact with the second metallic plate by two absorbent layers with the outer faces of which said second metallic plates are in close contact.

By combining a series of voltaic couples of the foregoing description a voltaic battery of considerable power can be produced.

Figure 1:
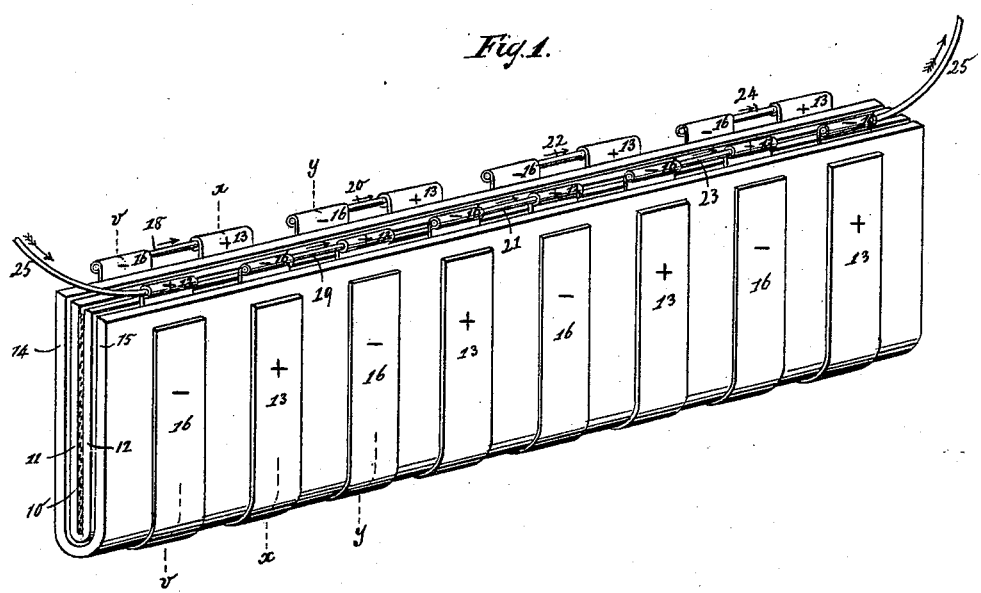
Figures 2, 3, 4:
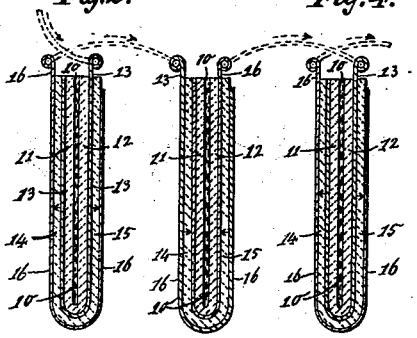
Figure 5:
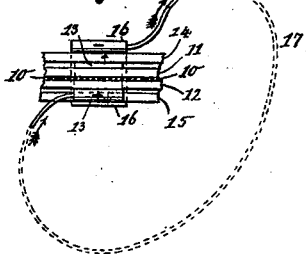

In the accompanying drawings, Figure 1 represents a perspective view of a voltaic battery constructed according to my invention. Fig. 2 is a transverse vertical section in the plane *v v* Fig. 1. Fig. 3 is a similar section in the plane *x x* Fig. 1. Fig. 4 is a similar section in the plane *y y* Fig. 1. Fig. 5 is a plan or top view of a voltaic couple constructed according to my invention.

My voltaic couple is composed of a dry layer 10 of a soluble electrolyte such for instance as ammonium chloride, two layers 11, 12, of an absorbent material such as blotting paper, which incloses the layer 10, a metallic plate 13 which is bent round the layers 11, 12 (best seen in Figs. 2, 3 and 4) two layers 14, 15 of an absorbent material and a metallic plate 16 which is bent round the layers 14, 15, the two plates 13 and 16 being made of metals of different polarity, for instance the plate 13 can be made of sheet zinc and the plate 16 of sheet copper. If the plates 13 and 16 are connected by a conductor 17, and the absorbent layers 11, 12, 14 and 15 are moistened, with a solvent of the electrolyte (for instance with water, if the electrolyte consists of a layer of ammonium chloride) an electric current is produced in the direction of the arrows shown in Fig. 5, the plate 16 being the positive and the plate 13 the negative pole of the couple, and this current is kept up, until the electrolyte is entirely decomposed provided the absorbent layers are maintained in a moist state.

In order to obtain an electric current of increased strength a series of my voltaic couples can be combined in the manner shown in Fig. 1. The second couple in the series a cross-section of which is shown in Fig. 3 is precisely the same in appearance as the first couple with the exception that the positive plate 13 which in the first couple lays inside the absorbent layers 14, 15, is placed on the outside of these absorbent layers while the negative plate 16, which in the first couple is situated on the outside of the absorbent layers 14, 15 is placed on the inside of these absorbent layers. The third couple in the series (Fig. 1) is precisely like the first, the fourth couple is precisely like the second and so on. By referring to Fig. 1 it will also be seen that the negative plate 16 of the first couple is connected with the positive plate 13 of the second couple by a metal wire 18, the negative plate 16 of the second couple is connected to the positive plate 13 of the third couple by a metal wire 19 the negative plate 16 of the third couple is connected to the positive plate 13 of the fourth couple by a metal wire 20 and in the same manner the negative and positive plates of the succeeding couples are connected by metal wires 21, 22, 23, 24 respectively as shown in Fig. 1. Finally the positive plate 13 of the first couple is connected with the negative plate 16 of the last couple by a metal wire 25.

In the drawings all the positive plates 13 can be distinguished by the sign + and all the negative plates 16 by the sign —.

What I claim as new, and desire to secure by Letters Patent, is—

1. A voltaic couple composed of a dry layer of a soluble electrolyte inclosed between two layers 11, 12 of an absorbent material a metallic plate 13 in close contact with the opposite faces of the absorbent layers 11, 12, two absorbent layers 14, 15 placed on the outside faces of the metallic plate 13, a metallic plate 16 which is in close contact with the opposite faces of the absorbent layers 14, 15 and the polarity of which is different from that of the metallic plate 13, and a metallic connection between the plates 13 and 16 substantially as described.

2. A voltaic battery composed of two absorbent layers 11, 12 inclosing a dry layer of a soluble electrolyte, a series of metallic plates 13 16 of different polarity in close contact with the absorbent layers 11, 12, two absorbent layers 14, 15 placed on the outside faces of the metallic plates 13 and 16 a second series of metallic plates 13, 16 of different polarity in close contact with the absorbent layers 14, 15 metallic connections 18, 20, 22, 24 between the outside metallic plates 16, 13 and metallic connections 19, 21, 23 between the inside metallic plates 16, 13 substantially as described.

In testimony whereof I have hereunto set my hand in the presence of two subscribing witnesses.

HENRY TIMM.

Witnesses:
W. C. HAUFF,
E. F. KASTENHUBER.